(12) United States Patent
Howitt et al.

(10) Patent No.: US 9,476,644 B2
(45) Date of Patent: Oct. 25, 2016

(54) SCRAP SUBMERGENCE SYSTEM

(75) Inventors: Roger Howitt, Burton-on-Trent (GB); Jim Grayson, Gurdon, AR (US); Mark Bolton, Suzhou (CN); Paul Bosworth, Derbyshire (GB)

(73) Assignee: PYROTEK INC., Spokane, WA (US)

( * ) Notice: Subject to any disclaimer, the term of this patent is extended or adjusted under 35 U.S.C. 154(b) by 395 days.

(21) Appl. No.: 14/131,227

(22) PCT Filed: Jul. 9, 2012

(86) PCT No.: PCT/US2012/045919
§ 371 (c)(1),
(2), (4) Date: Mar. 12, 2014

(87) PCT Pub. No.: WO2013/006852
PCT Pub. Date: Jan. 10, 2013

(65) Prior Publication Data
US 2014/0232048 A1   Aug. 21, 2014

Related U.S. Application Data

(60) Provisional application No. 61/505,156, filed on Jul. 7, 2011, provisional application No. 61/625,134, filed on Apr. 17, 2012.

(51) Int. Cl.
| | | |
|---|---|---|
| *F27B 3/18* | (2006.01) |
| *F27D 3/14* | (2006.01) |
| *C22B 7/00* | (2006.01) |
| *F27B 3/04* | (2006.01) |
| *C22B 21/00* | (2006.01) |
| *F27D 27/00* | (2010.01) |

(52) U.S. Cl.
CPC ............... *F27B 3/045* (2013.01); *C22B 7/003* (2013.01); *C22B 21/0092* (2013.01); *F27B 3/18* (2013.01); *F27D 27/00* (2013.01); *Y02P 10/218* (2015.11)

(58) Field of Classification Search
CPC ..... C22B 7/003; C22B 21/0092; F27B 3/04; F27B 3/045; F27B 3/18; F27D 27/00; F27D 3/00; F27D 3/14; F27D 2003/0007
USPC ........................................ 266/222, 233, 236
See application file for complete search history.

(56) References Cited

U.S. PATENT DOCUMENTS

6,217,823 B1   4/2001  Vild et al.

*Primary Examiner* — Lois Zheng
(74) *Attorney, Agent, or Firm* — Fay Sharpe LLP (57) ABSTRACT

In accordance with one aspect of an exemplary embodiment, a furnace including a charge well is provided. The charge well comprises an open top chamber including side and base walls of a heat resistant material. An inlet is provided in a side wall of the chamber for receiving molten metal. A ramp is provided adjacent the side wall and an inner wall forms a central cavity. The ramp is disposed between the inner wall and the side wall. The ramp is generally inclined from an intersection with the base wall to adjacent a top surface of the inner wall. The cavity is in fluid communication with an outlet. A passage in the inner wall provides fluid communication between the inlet and the cavity. The inlet and an outlet each receives a conduit and at least one of the conduits can include an elbow joint.

9 Claims, 12 Drawing Sheets

SCRAP SUBMERGENCE SYSTEM

This application claims the benefit of U.S. Provisional Application No. 61/505,156, filed Jul. 7, 2011 and U.S. Provisional Application No. 61/625,134, filed Apr. 17, 2012, the disclosures of each are herein incorporated by reference.

BACKGROUND

The present invention is directed to a scrap submergence system of the type typically employed in molten metal processing. For example, it has application in the recycling of aluminum, but is not limited thereto. In the recycling of metals, it is necessary to melt scrap pieces for treatment and processing. A large portion of the scrap pieces are thin walled as a result of the mechanical shaping action from which they are formed, such as, shaving, boring and cold rolling. Melting thin walled scrap pieces is particularly difficult because (i) extended exposure to the hostile atmosphere in a traditional melting furnace results in extremely high oxidation loss and, (ii) rapid submergence in molten metal is severely hampered by the fact that thin walled scrap pieces float on molten metal.

In a typical melting operation, a melting furnace is provided with an enclosed hearth and a connected open melting bay or charge well. A pump or other molten metal flow inducing apparatus causes molten metal to flow from the hearth to the charge well. Metal scrap pieces are fed into the charge well. Pumps can be centrifical impeller driven versions or electromagnetic. This disclosure is compatible with either device but finds particular relevance to electromagnetic pumps which can be utilized in a dry hearth condition meaning a relatively low molten metal fill (e.g. <4 inches). Electromagnetic pumps work on the linear motor principal in which a conductor is magnetically repulsed by a magnetic field generated by the surrounding coil. Further details of the design, its principals and operation can be found in GB-B-2269889 the contents of which, particularly in relation to features of the electromagnetic pump principles and operation and system configuration, are incorporated herein by reference.

A variety of apparatus have been used in the melting bay (specifically in the charge well) to facilitate the submergence of the scrap metal below the surface of the molten metal bath. Three major types of systems exist. The first type includes mechanical systems constructed primarily of a rotor which creates a molten metal flow at the top surface. Examples of these devices are shown in U.S. Pat. Nos. 3,873,305; 3,997,336; 4,128,415; and 4,930,986. The second type of system uses a mechanical device to physically push the scrap below the melt surface (elephant feet/wellwalkers). The third type of system relies on the shape of the chamber without rotation of a rotor to create a metal flow which submerges scrap pieces in the charge well. Particularly, the flow of molten metal into the charge well is manipulated in such a manner to achieve a vortex which draws chips from the top surface into the bath. These systems include, for example, U.S. Pat. Nos. 3,955,970; 3,984,234; 4,286,985; and 6,217,823, each of which is herein incorporated by reference. The present disclosure is directed to this third type of scrap submergence system.

Figure 1:
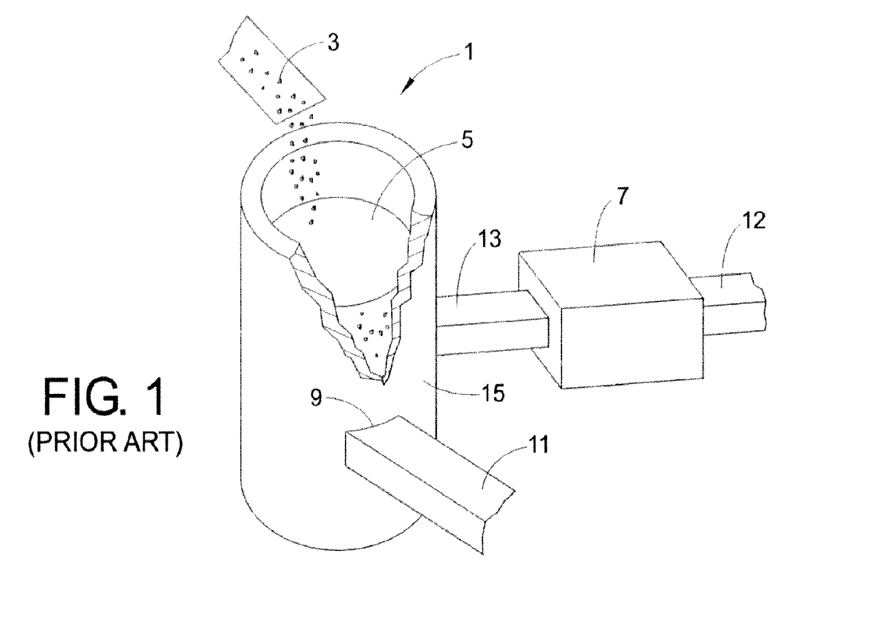
FIG. 1 illustrates a prior art scrap melting system.
Figures 2, 3:
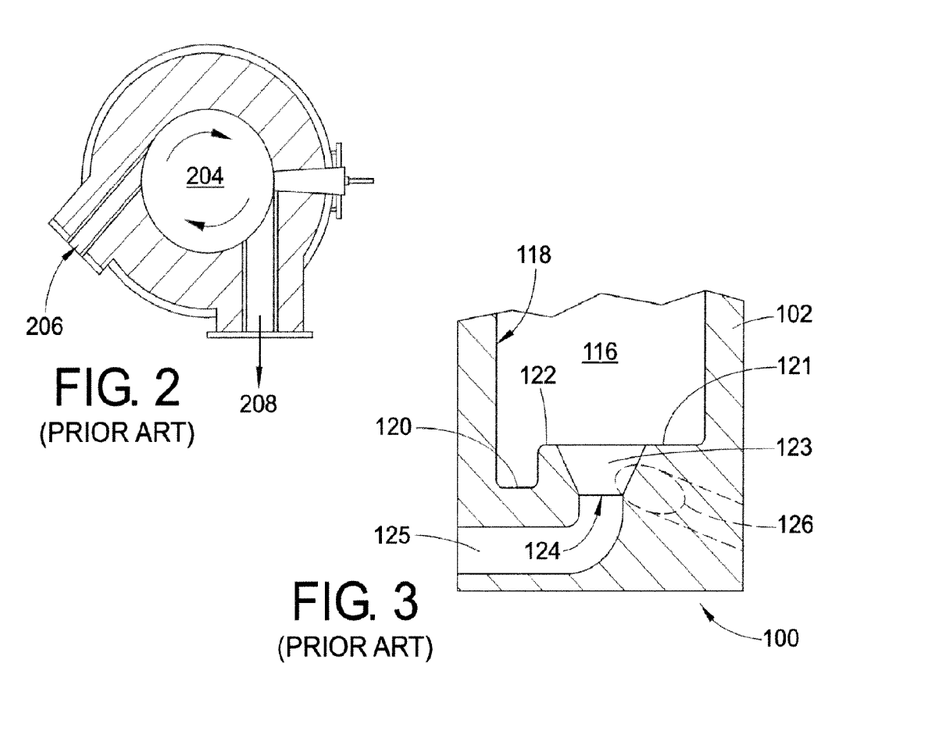
FIG. 2 is a cross-sectional view of a first prior art charge well.
FIG. 3 is a cross-sectional view of a second prior art charge well.

FIG. 1 illustrates one prior art scrap submergence system of a type with which the present disclosure is associated. The apparatus includes a charge well 1 into which solid metal 3 is introduced so as to intimately contact it with molten metal 5. The charge well 1 has an internal profile which in combination with rapid molten metal flow causes a vortex in the molten metal surface which promotes the blending of the solid metal 3 into the molten metal 5. The rapid molten metal flow is generated by an electromagnetic pump unit 7. More particularly, molten metal 5 leaves the charge well 1 via outlet 9 and passes through conduit 11 into the furnace (not shown). Molten metal is drawn from the furnace by the pump unit 7 via conduit 12 and then introduced to the charge well 1 through 13 and inlet 15. The conduit 13 is aligned with the peripheral wall of charge well 1 in a substantially tangential manner to promote a vortex formation in the charge well 1. FIG. 2 provides a top plan view of a representative charge well.

Reference is made to FIG. 3 wherein a scrap melting device 100 is comprised of a block of refractory material 102 which can be constructed of a size suited to provide a relatively close tolerance mating with the dimensions of an existing charge well or could form a newly constructed charge well itself. Preferably, device 100 is constructed of a cured material such as an alumina-silica refractory or other castable refractory material known to those skilled in the art. Block 102 includes a chamber 116 having generally cylindrical side wall 118, a base wall 120, a ramp 121 disposed around an inner wall 122 forming a central cavity 123 leading to outlet 124 and outlet duct 125. Ramp 121 includes a leading edge adjacent the inlet 126 to the chamber 116. In practice, the device 100 has been found to provide superior scrap melting performance.

As stated previously, the present disclosure is not suited solely to recycling. Rather, at various stages during the melting, treatment, purification and distribution of molten metals it may also be desirable to introduce external materials in addition to scrap metal into the molten metal. These materials may be gases to extract undesired components from the molten metal, or powders to introduce desired components into the molten metal. The present disclosure also provides an apparatus and method for efficiently introducing such materials into molten metal. The apparatus and method advantageously provide greater contact between the material added and the molten metal as a whole.

The present disclosure further provides an apparatus and method having improved compatibility with the variety of molten metal furnace configurations that exist.

BRIEF DESCRIPTION

In accordance with one aspect of an exemplary embodiment, a furnace including a charge well is provided. The charge well comprises an open top chamber including side and base walls of a heat resistant material. An inlet is provided in a side wall of the chamber for receiving molten metal. A ramp is provided adjacent the side wall and an inner wall forms a central cavity. The ramp is disposed between the inner wall and the side wall. The ramp is generally inclined from an intersection with the base wall to adjacent a top surface of the inner wall. The cavity is in fluid communication with an outlet. A passage in the inner wall provides fluid communication between the inlet and the cavity.

According to a second embodiment, a furnace including a charge well having an open top chamber including side and base walls of a heat resistant material, an inlet in a side wall of the chamber for receiving molten metal, a ramp adjacent said side wall of the chamber, and an inner wall forming a central cavity is provided. The ramp is disposed between the inner wall and the side wall. The ramp is inclined from an intersection with the base wall to adjacent a top surface of the inner wall. The cavity is in fluid communication with an outlet. A passage in the inner wall provides fluid communication between the inlet and the cavity. A removable insert comprised of a heat resistant material and shaped for removable securement within the passage is also provided. The removable insert blocks at least a portion of the passage and optionally the entirety of the passage.

According to a third embodiment, a charge well for molten metal is provided. The charge well includes a mixing bowl having an inlet and an outlet. The inlet receives a first conduit. The outlet receives an elbow joint. The elbow joint receives a second conduit configured for mating with an associated furnace.

According to a fourth aspect of the disclosure, a furnace including a container for molten metal is provided. The container has a maximum depth for molten metal within the container, and further includes a first conduit connected to the container at an entrance and an elbow connected to the container at an exit. The first conduit is in association with a flow generator. The elbow provides fluid communication between the exit and a second conduit.

According to a further embodiment, a system for submerging molten metal including a charge well in fluid communication with a conduit for receiving molten metal from a furnace is provided. The conduit is mated to said furnace by an adapter. The adapter comprises an elongated body formed of a refractory material. The body defines a passage having a first end having a first dimension (W) and a second transverse dimension (H), wherein W>H, and a second substantially circular end having a diameter (D), wherein D≤H.

BRIEF DESCRIPTION OF THE DRAWINGS

FIG. 15 A-F provide detailed view of the adapter of FIG. 14;

wherein 15A is a bottom side perspective view;

15B is a left side view;

15C is a top cross-section view taken along line C-C of 15B;

15D is a bottom side cross-section view;

15E is a left hand end view; and, 15F is a right hand end view.

Partial cross-sectioning is used to show details.

DETAILED DESCRIPTION

According to a first aspect of the invention, processing apparatus for molten metal is provided. The apparatus includes a furnace chamber for the molten metal, a pump, an outlet leading from the furnace chamber to the pump, an outlet leading from the pump to a charge well and a passage leading from the charge well to the furnace chamber. The processing apparatus may be for melting metal or metal containing materials and/or for processing molten metal and/or for purifying molten metal and/or for distributing molten metal. The pump can be a centrifugal or electromagnetic.

With reference to FIG. 3, in a cold start or in a dry furnace condition, the vortexing well of the device described in U.S. Pat. No. 6,217,823 has proven problematic if used as the charge well of the system depicted in FIG. 1. Moreover, if the molten metal processing system is at a low metal level (dry hearth), inner wall 122 serves as a dam to the flow of molten metal and an impediment to molten metal flow reaching outlet 124.

Accordingly, the art has adopted an alternative version as demonstrated in FIG. 2. This design allows the system to function even at very low molten metal levels. In this design, the scrap submergence chamber 204 relies on the tangential flows created by substantially coplanar inlet 206 and outlet 208 to create a vortex for scrap submergence. There is no intervening structure between inlet 206 and outlet 208 that restricts molten metal flow. However, it has been found that the vortex created by the design of FIG. 2 is not necessarily sufficient for all scrap submergence applications. For example, if the aluminum alloy includes relatively high levels of silicon, scrap submergence becomes particularly challenging.

Figure 4:
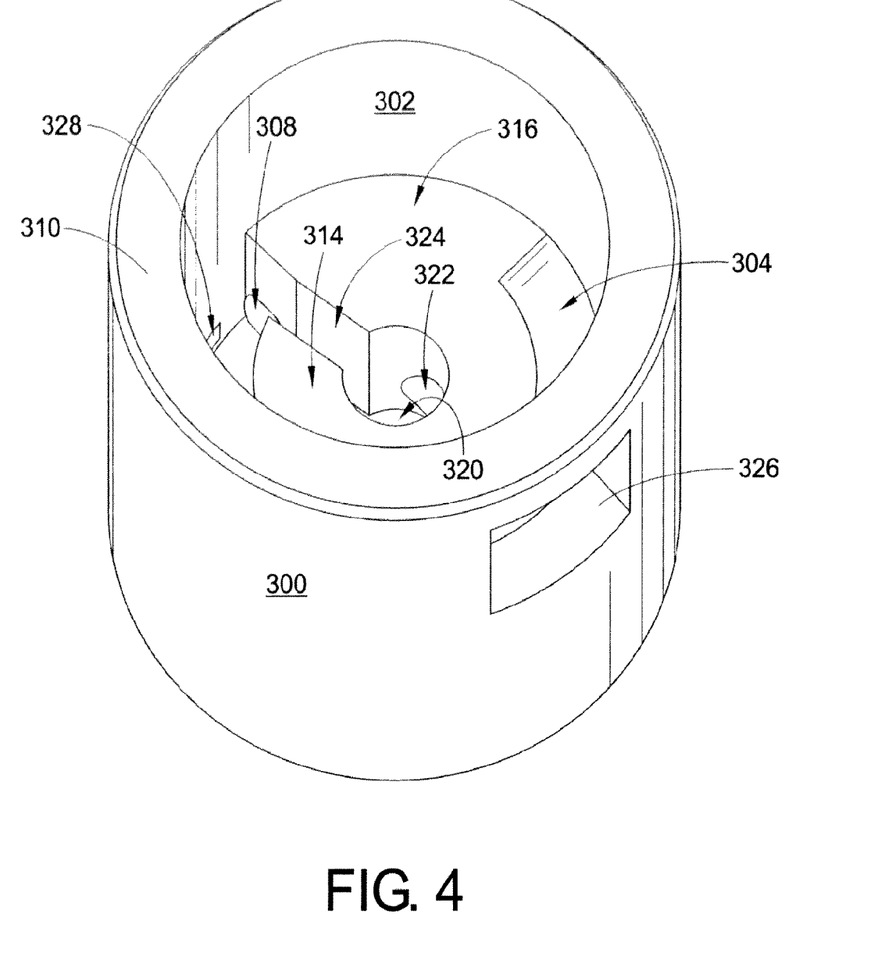
FIG. 4 is a perspective view of the charge well of the present invention.
Figure 5A:
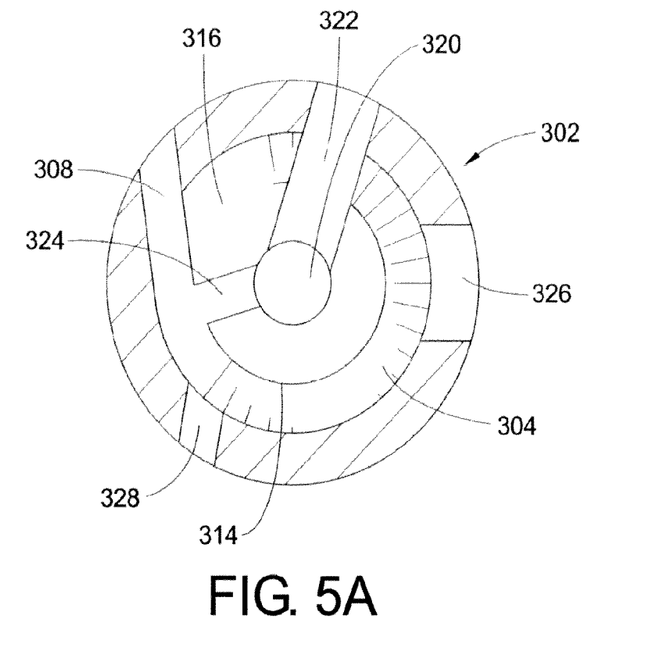
FIG. 5A provides a top partially cross-sectional view of the charge well of FIG. 4, while FIG. 5B provides a cross-sectional view along line C-C.
Figure 5B:
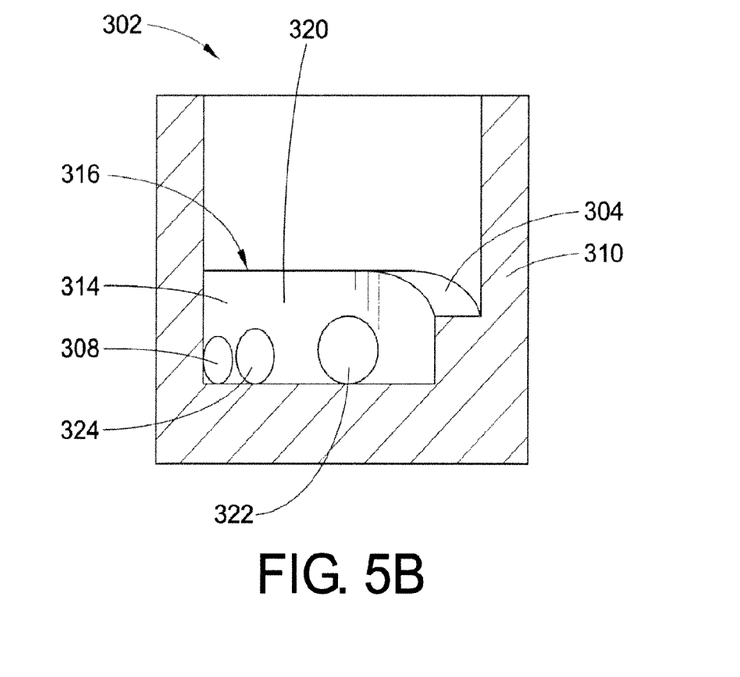

Referring now to FIGS. 4 and 5A-5B, a modified charge well insert suitable for use in the system of FIG. 1 (as one example) is depicted which provides the advantages of both a strong vortexing design and operability in low molten metal depth conditions such as cold start and/or dry hearth. The design is also advantageous in that it allows for the direction of the molten metal flow to be reversed. This is a unique feature of an electromagnetic pump and it is useful to disrupt the formation of clogs in the conduits of the system.

Charge well 300 defines a vortexing chamber 302 within which a ramp 304 resides. Molten metal is injected into the chamber 302 via inlet passage 308. The molten metal entering chamber 302 is forced up ramp 304 which is disposed between outer chamber wall 310 and inner chamber wall 314. Ramp 304 generally extends about 225° around the chamber 302 from a low point adjacent the charge well base wall relatively near inlet passage 308 to a point of merger with a shelf 316 which also mergers with inner wall 314. Molten metal flowing up ramp 304 creates a rotation of the molten metal bath within the chamber 302 and tumbles into cavity 320 which is in communication with outlet passage 322. The tumbling of the molten metal into the cavity 320 creates a desirable folding action in the molten metal bath which is highly effective in submerging scrap materials.

A communication port 324 extends through inner chamber wall 314 from adjacent inlet passage 308 to provide fluid communication with cavity 320. This allows molten metal flow between the inlet leg of the system and the outlet leg of the system even when the molten metal level is not sufficiently high to rise above the inner chamber wall 314. Accordingly, legs 11 and 13 (of FIG. 1) are in molten metal communication even at low molten metal levels. Similarly, if the direction of the molten metal flow is reversed, wherein outlet passages 322 becomes an inlet, and inlet passage 308 becomes an outlet, communication port 324 makes this possible. A safety overflow opening 326 is provided to allow molten metal to be directed into the furnace rather than overflowing the charge well top in the event of a clog. However, if properly equipped with metal level probes, the overflow opening can be eliminated. Clean out port 328 is included to provide access to inlet 308 and upstream thereof to the electromagnetic pump with a suitable tool.

A polystyrene form can be used to produce features such as tapers and passages in the casting of the refractory. Preferably, faces receiving conduits, etc. will be smooth to allow effective gasketing.

Referring now to FIGS. 6-10, an alternative charge well insert is depicted. The charge well insert is similar to the design set forth in FIGS. 4 and 5. The charge well insert of FIGS. 6-9 is slightly divergent in that the outer wall of the well and the ramp are not provided. Rather, the depicted inserts (600, 800) are positioned within a well including those components.

Figure 10:
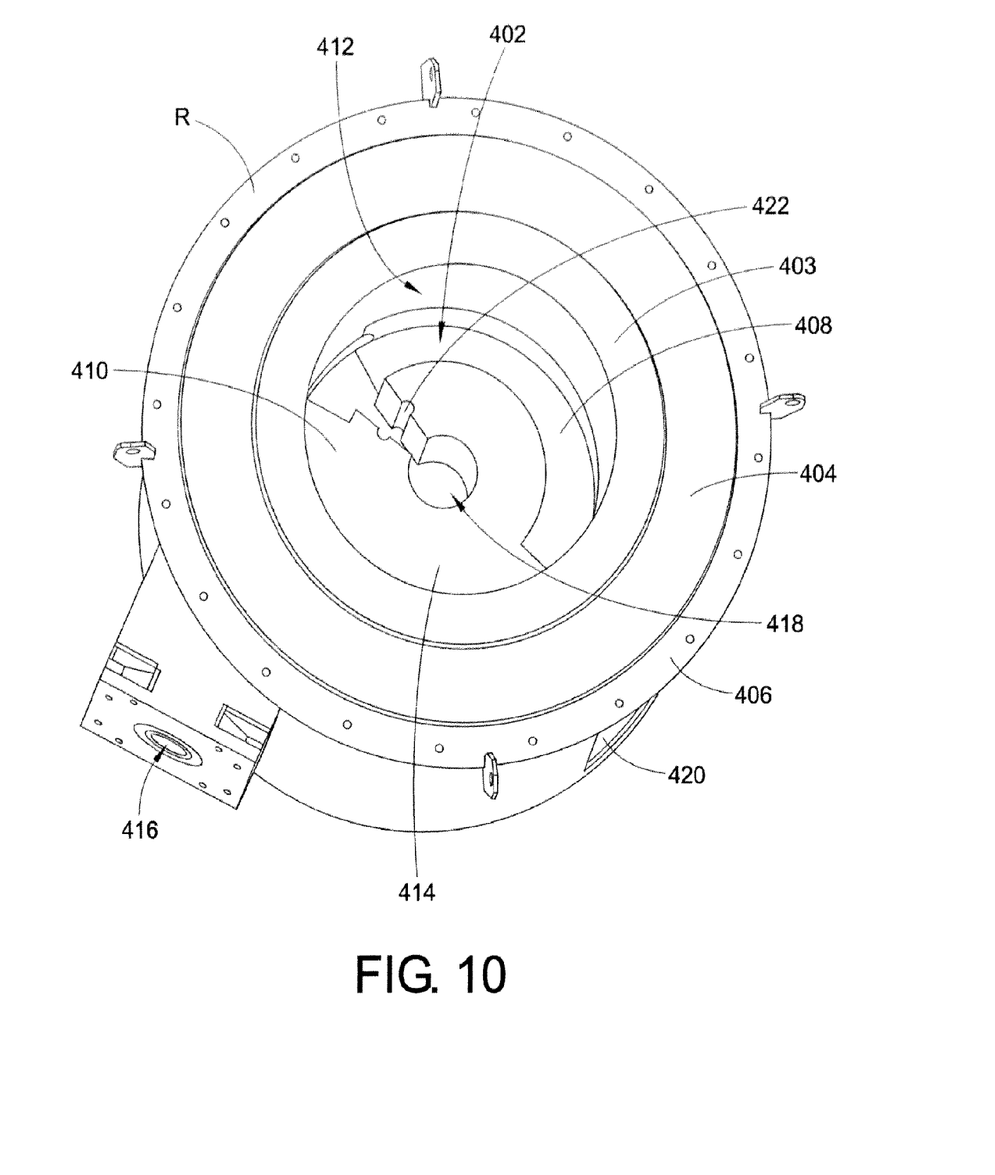
FIG. 10 provides a bottom end perspective view of a charge well containing a charge well insert of the type depicted in FIGS. 6-9.

Moreover, with particular reference to FIG. 10, a charge well insert 402 sits within a generally cylindrical refractory outer wall 403 which is encompassed by an insulating layer 404 which is disposed within metal sheathing 406. A ramp 408 is disposed between refractory wall 403 and inner wall 410 of insert 402. The ramp can be an integral component of either the refractory wall, the inner wall, or can be a separate element as shown here. The ramp 408 can have a lowest point aligned at approximately point R and rise as it wraps around the side wall 412 of refractory wall 403 to meet top surface 414. Point R is selected to position the leading edge of the ramp inlet facing passage 416 which receives molten metal into the charge well. Molten metal flows up ramp 408 and spills into cavity 418, exiting through outlet 420. A keyhole 422 is also provided to facilitate passage of molten metal directly from inlet 416 to outlet 420 without flowing up ramp 408. This facilitates operation at low metal levels.

Referring again to FIGS. 6 and 7, one suitable charge well insert is depicted. Insert 600 includes Insert 600 can be provided with a selectively removable dam element 609, which blocks a port 611 otherwise existing in the refractory wall 601. Port 611, as described above, is provided for situations such as dry hearth conditions where low metal levels exist. In this regard, blocking element 609 can be removed allowing molten metal to pass directly from passage 605 through port 611 into cavity 613 and out exit 615. In operation, molten metal forms a vortex in the chamber as it rises up the ramp adjacent the outer surface 601 of insert 600 and spills over the top surface 603 into cavity 613, exiting through outlet 615.

Figure 6:
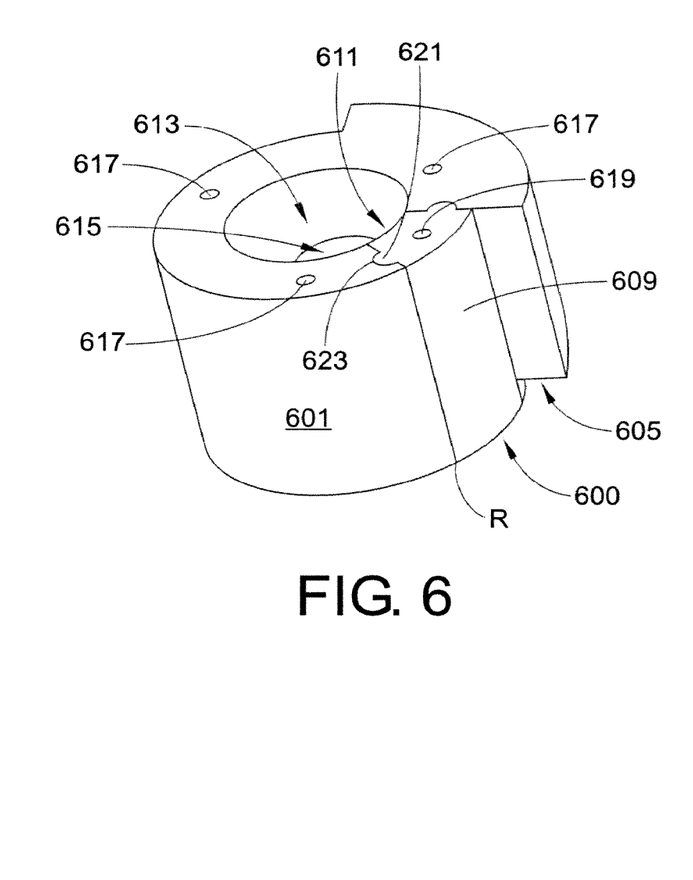
FIG. 6 provides a top end perspective view of an alternative charge well insert including an adjustable closed-open communication port.
Figure 7:
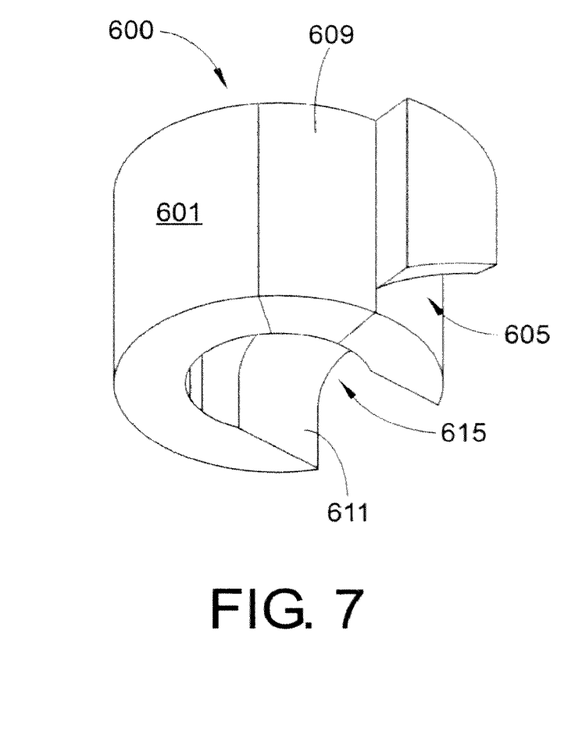
FIG. 7 provides a bottom end perspective view of the insert of FIG. 6.

Insert 600 can include a plurality of bores 617 which receive hooks or other elements to facilitate the insertion and removal of insert 603 from the charge well. Similarly, dam element 609 is provided with a bore 619 to receive hooks or other elements to facilitate the selective insertion and or removal of dam element 609 from its blocking position with port 611. Dam element 609 is retained within port 611 via cooperative key elements 621 and keyway elements 623 formed in the side wall 601.

Figure 8:
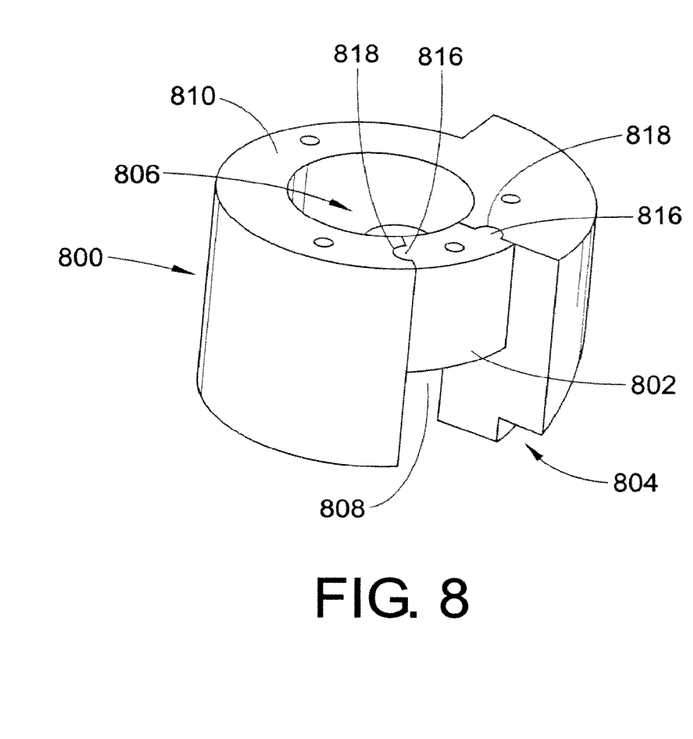
FIG. 8 provides a top end perspective view of an alternative charge well insert including a restricted communication port.
Figure 9:
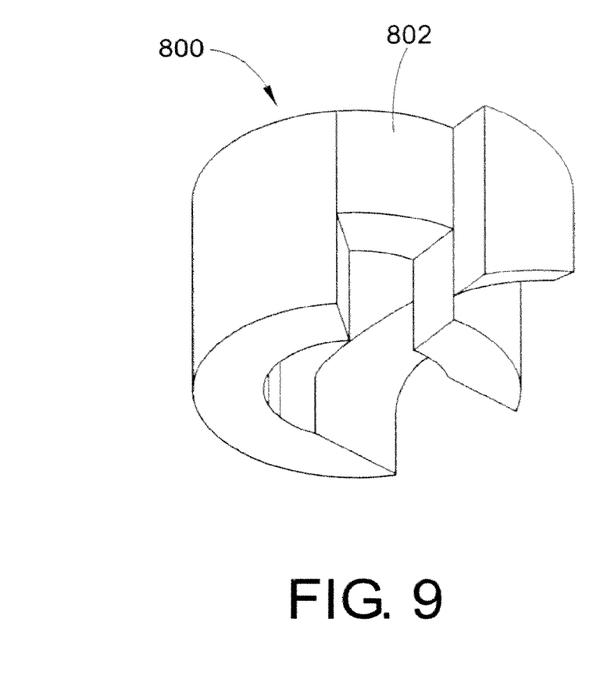
FIG. 9 provides a bottom end perspective view of the insert of FIG. 8.

Referring now to FIGS. 8 and 9, an alternative molten metal insert 800 is depicted wherein only a partial dam element 802 is provided. Partial dam element 802 partially blocks a path of molten metal through passage 808 located between inlet 804 and cavity 806 yet a contiguous top surface 810 is provided to minimize degradation of the vortex. Dam element 802 can include key elements 816 and the side wall of insert 800 can include cooperative keyway elements 818 to facilitate removable securement.

A further shortcoming of the device of FIG. 1 is the constraint on the orientation of the inlet and outlet conduits. Moreover, there are limited options for the relative angle between the conduits to provide a properly functioning charge well. More particularly, it is beneficial to have the inlet the charge well tangentially to achieve the optimum circulation within the bowl. The outlet can be a center outlet or may be tangential to the bowl. This results in limited options with respect to the necessary point of intersection of the conduits with a furnace (for example). In short, the straight leg conduits may not provide optimum points of intersection between the charge well and the furnace.

Figure 11:
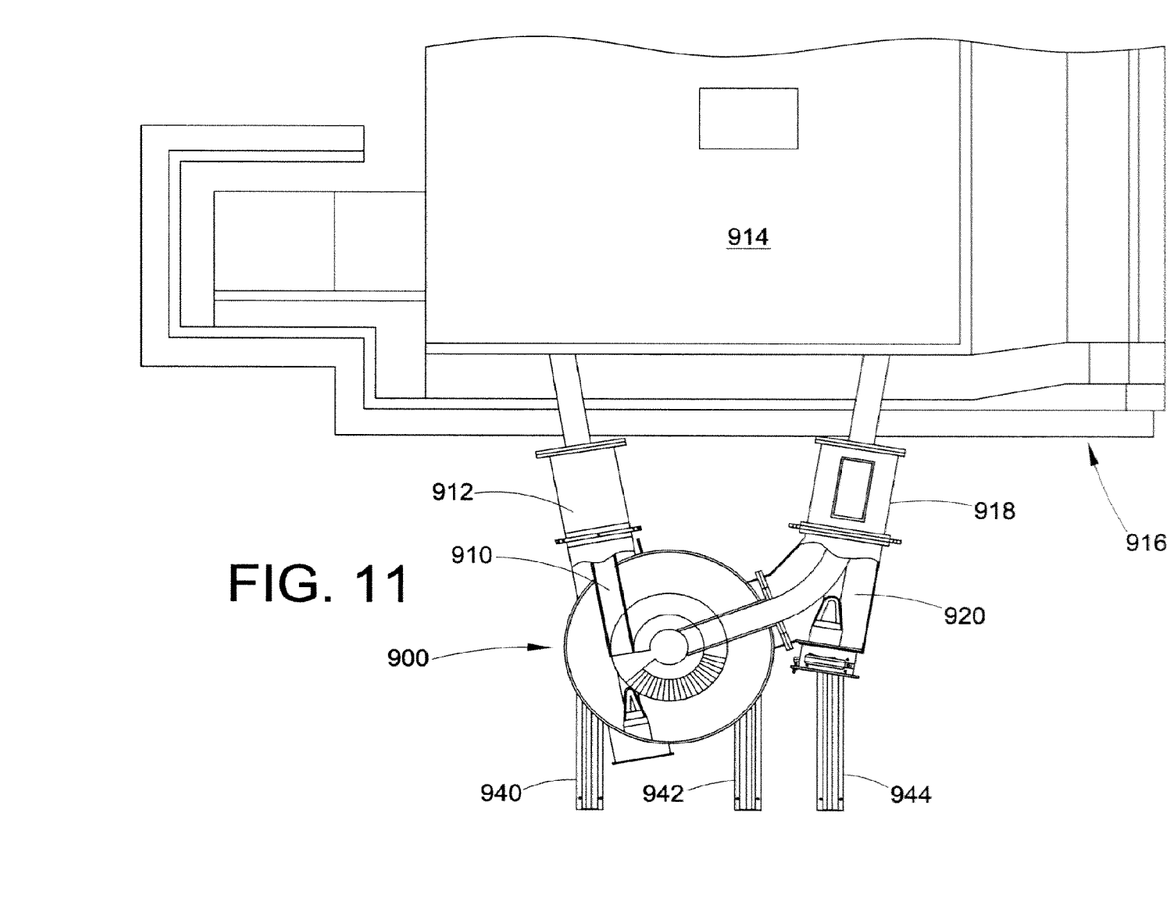
FIG. 11 is top plan view (partially in cross-section) of a mixing system in accord with the third and/or fourth embodiment of the disclosure.
Figure 12:
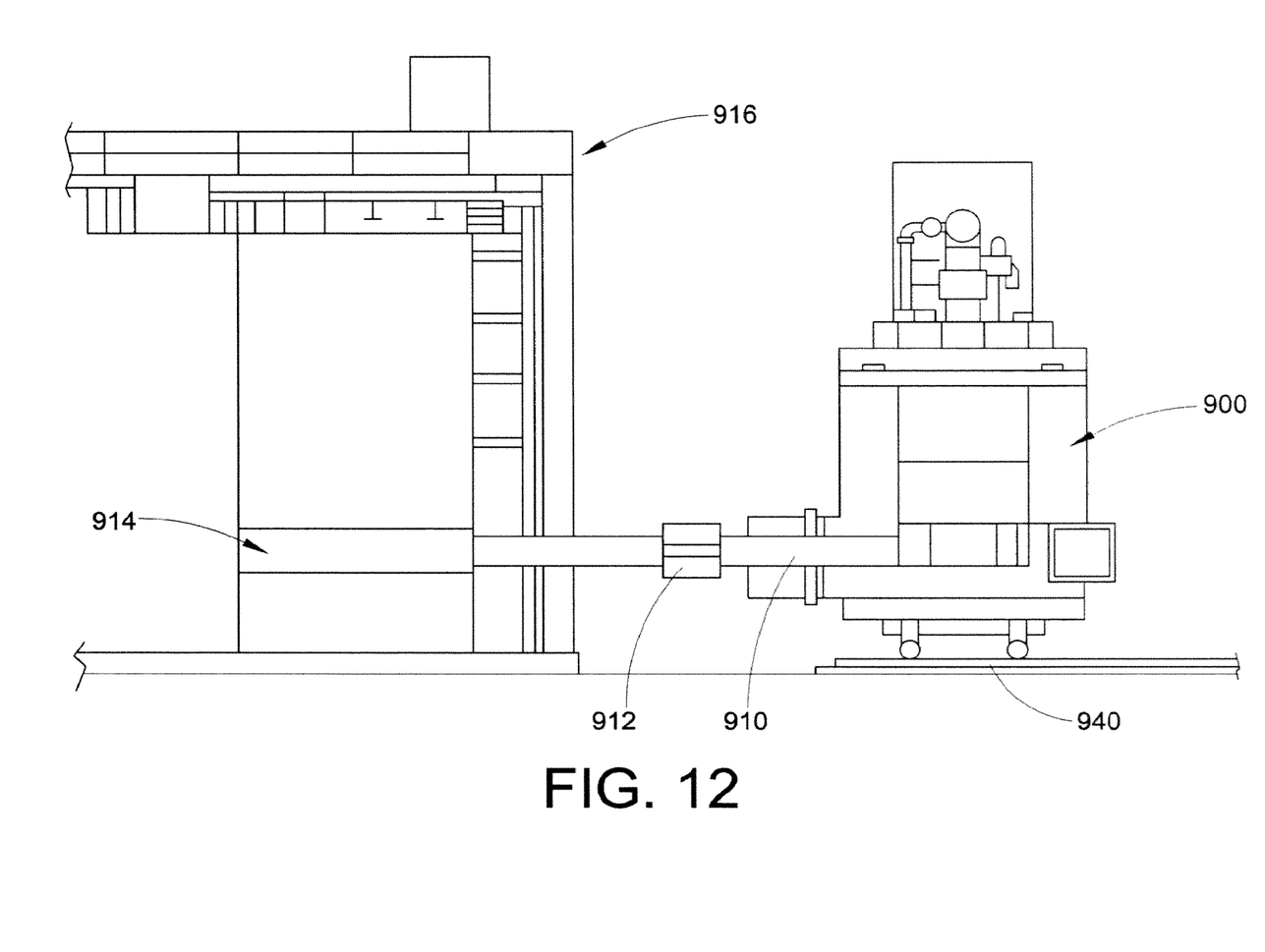
FIG. 12 is a side view of the mixing system of FIG. 11.
Figure 13:
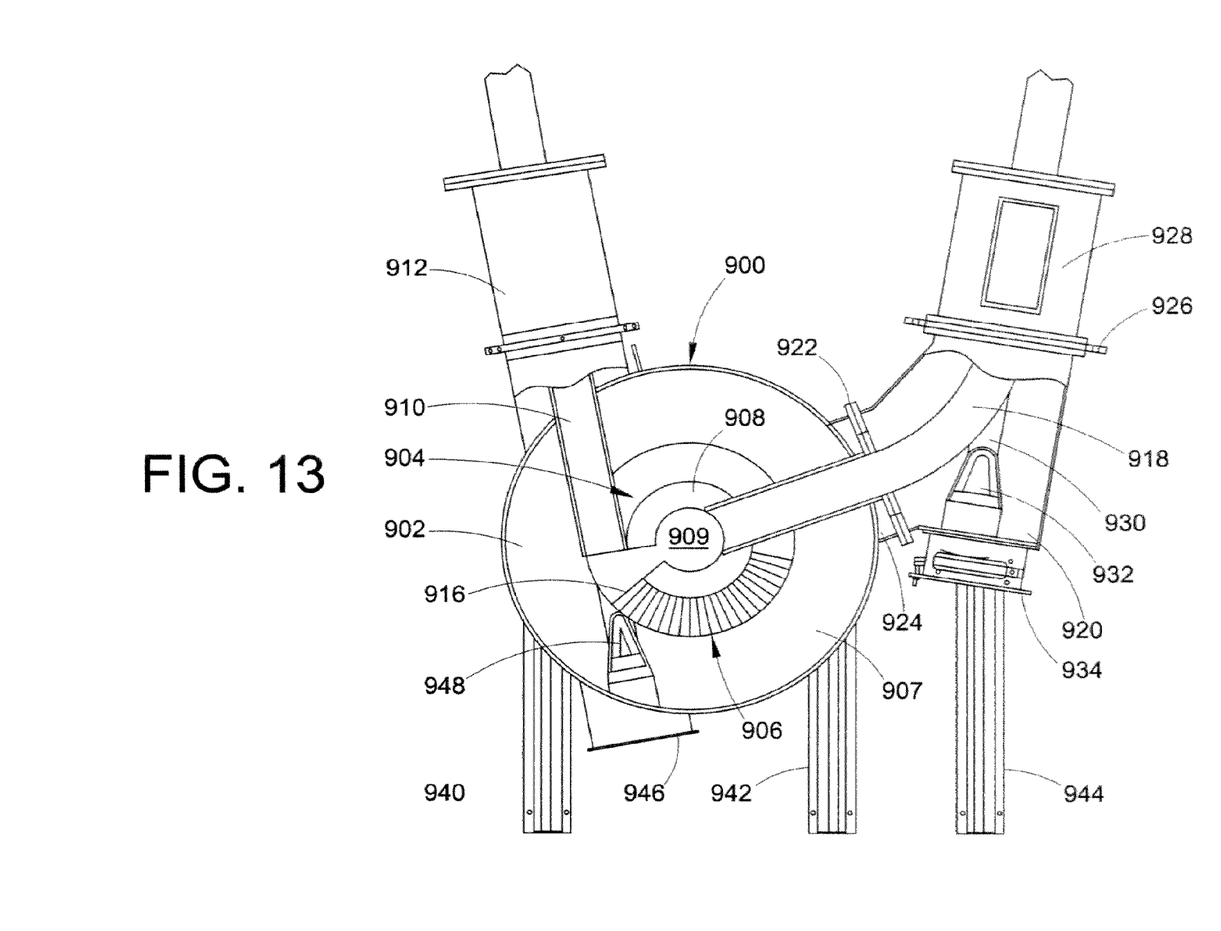
FIG. 13 is an enlarged top view (partially in cross-section) of the mixing device of FIG. 11.

Referring now to FIGS. 11-13, a charge well 900 is provided. Charge well 900 is comprised of a general cylindrical body 902 forming a mixing chamber 904 including a ramp 906 adjacent the outer wall 907 of the mixing chamber 904 and an inner wall 908 defining an outlet cavity 909. An inlet conduit 910 is provided in association with an electromagnetic pump 912 which itself is in fluid communication with the molten metal bath 914 of a furnace 916. Inlet conduit 910 is disposed to create a molten metal flow within mixing chamber 904 and more particularly to discharge molten metal towards the leading edge 916 of ramp 906.

The outlet conduit 918 is comprised of an elbow member 920 secured via split flange 922 to an outlet adaptor 924 formed on the outer surface of the charge well 900. Elbow member 920 is joined via a second split flange 926 to a straight conduit 928 intended for mating with the furnace 916. The elbow member can form an angle between 15 and 90 degrees. For clarity, in the case where the outlet is parallel to the face of the furnace, the outlet is at 0° from the mixing chamber and 90 degrees results in a conduit entering the furnace perpendicular the face of the furnace.

Elbow member 920 is fitted with a clean out port 930 in which taping cone 932 is disposed. Seal 934 provides access to clean out port 930 allowing taping cone 932 to be forcibly inserted into the outlet conduit 918 for cleaning. Advantageously, by providing an elbow of a predetermined turning angle, the location at which outlet conduit 918 meets the furnace 916 can be tailored as necessary.

A rail system can be provided to facilitate movement of the charge well 900 wherein two rails 940, 942 allow placement of charge well 900 as desired adjacent to the furnace, and a a third rail 944 can be provided to support the outlet conduit 928 and elbow member 920 upon detachment from the charge well 900.

Inlet conduit 910 is similarly accessed for cleaning via the inclusion of a inlet clean out port 946 having taping cone 948 disposed therein.

The typical conduit (910 and 918, for example) will be comprised of a ceramic tube surrounded by a refractive material encased by a steel shell. The elbow member may also be comprised of a cast refractory such as a 466 silicon carbide.

The present disclosed embodiment is advantageous because the charge well 900 can be standardized for manufacturing efficiency while use of elbow 918 allows customization for each furnace structure and floor space availability associated therewith. Moreover, by providing a elbow member having a suitable angle, it is possible to utilize a standard design charge well wherein the inlet and outlet are advantageously positioned, yet the system is adjustable via the tailoring of the elbow angle to properly align with the associated furnace. It is noted that it is also conceivable that the inlet conduit could be equipped with an elbow joint to provide even greater system design flexibility.

Figure 14:
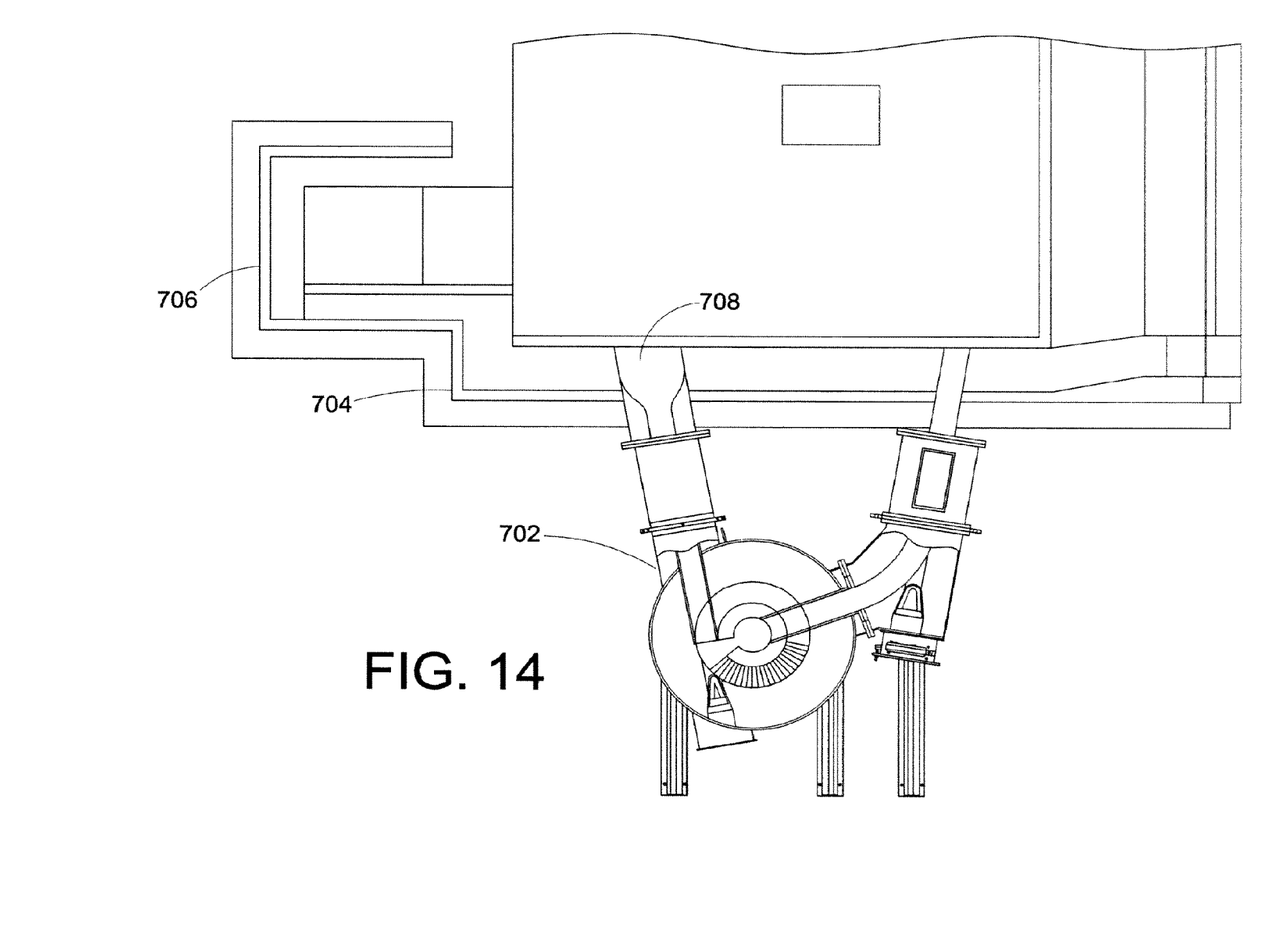
FIG. 14 is a top perspective view partially in cross-section of a mixing system of a further embodiment including an outlet adaptor mated with the furnace.
Figure 15A:
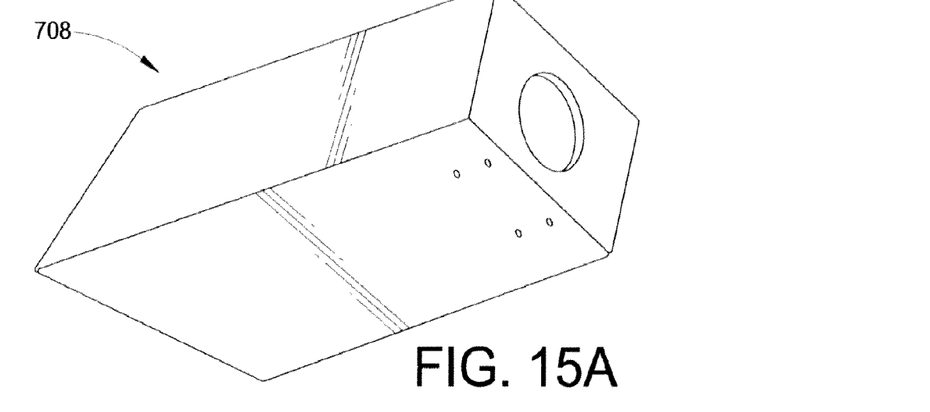
Figure 15B:
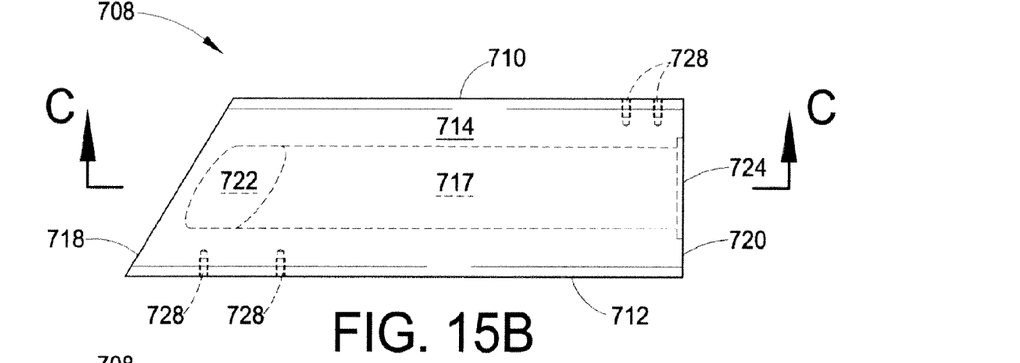
Figure 15C:
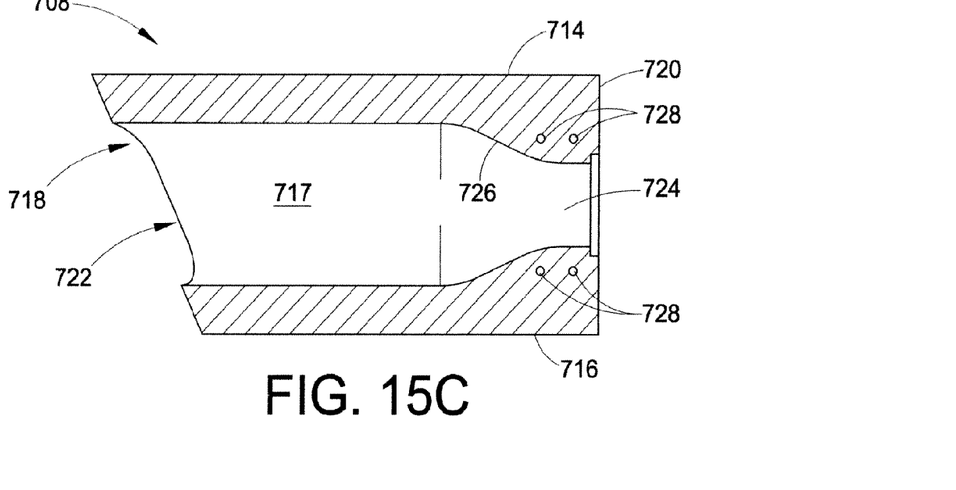
Figure 15D:
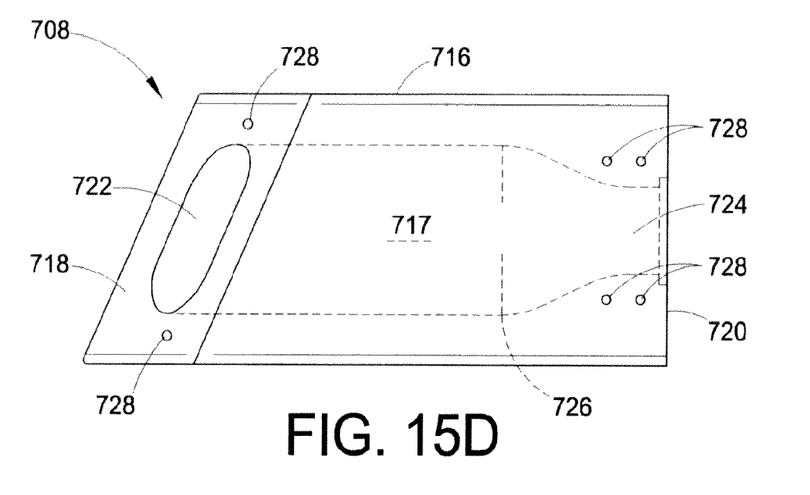
Figure 15E:
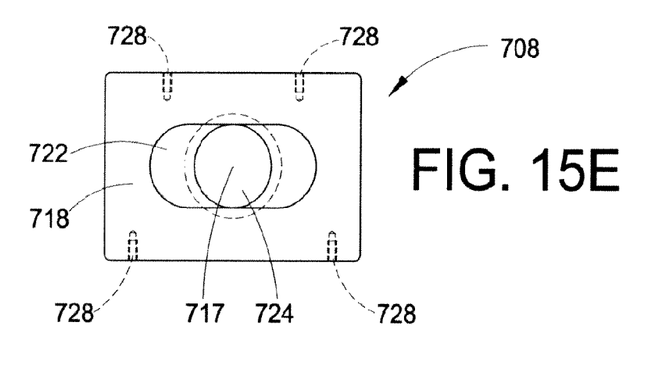
Figure 15F:
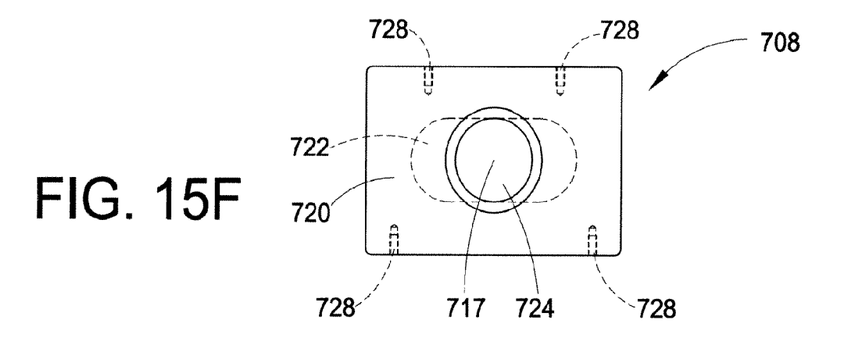

According to a further embodiment and with reference to FIGS. 14 and 15 A-F, an improved interface between a return leg conduit 702 and the outlet 704 to the furnace 706 is provided via an adaptor 708. The adaptor 708 is a cast refractory body strengthened with stainless steel fibers.

The adaptor 708 can have any shape, with a rectangular prism serving as one example. In certain embodiments, it may be beneficial for a first end of the rectangular prism to have an angled end wall. Similarly, it may be desirable for the end contacting the furnace to be angle from bottom to top or top to bottom. Moreover, as is discernible from FIG. 14, the conduit 702 may not intersect the furnace at a 90° angle. Accordingly, providing the adaptor with an inclined end wall substantially matching the angle of entry of the conduit into the furnace is advantageous. Furthermore, the conduit will not necessarily have a horizontal orientation into the furnace. As such, angling the vertical incline of the mating face to match the tilt of the conduit can be beneficial.

With specific reference to FIGS. 15A-F, the adaptor 708 includes top wall 710, bottom wall 712, elongated side wall 714 and truncated sidewall 716. A passage 717 extends from angled end wall 718 to square end wall 720. Angled end wall 718 has a compound angle from sidewall to sidewall and from bottom to top. The passage 717 includes an inlet end 722 having an area greater than the area of an outlet end 724. More particularly, the inlet end can be elliptical having a width W and height H while the outlet end can be circular with a diameter D. The first dimension (W) and the second transverse dimension (H) can have the relationship W>H, and the second substantially circular end can have a diameter (D) with the relationship D≤H. Preferably, a transition zone 726 is provided between the inlet end 722 and the outlet end 724. The transition zone 726 can be a gradual taper to prevent disruptive flow patterns.

Generally speaking, the adaptor can have any desired inlet shape, provided the inlet dimension is larger than the outlet dimension. For example, it may be desirable to have a rectangular, oval, or elliptical inlet extended in a horizontal direction. This design provides an increased surface area that is, nonetheless an increased surface area compacted in a vertical dimension to allow exposure to decreasing levels of molten metal for the longest time period.

A plurality of bores 728 can be provided to receive screws, bolts, posts, etc. used to secure the adapter to the conduit and furnace.

The design has been developed to ensure there is an adequate supply of molten metal at the entrance to the electromagnetic pump which will maximize the throughput of the pump. The design will also reduce the negative effects of fluid dynamics that take place in the entrance area of the standard inlet tube design and eliminate particulate deposition.

The design incorporates the means to fully adjust the height and location of the refractory block during the installation into the main furnace refractories. The length of the block can be manufactured over size to enable the block, once embedded in the furnace refractories to be trimmed back to be flush with the furnace hot face.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A furnace including a charge well, said charge well comprising an open top chamber including side and base walls of a heat resistant material, an inlet in a side wall of the chamber for receiving molten metal, and an inclined ramp adjacent said side wall of the chamber, an inner wall forming a central cavity, said ramp disposed between said inner wall and said side wall, said cavity in fluid communication with an outlet, and a passage in said inner wall providing fluid communication between said inlet and said cavity.

2. The furnace of claim 1 further including a conduit providing fluid communication between said charge well and the furnace, the conduit including an elbow joint.

3. The furnace of claim 1 further including an adaptor mating a conduit to said furnace, said adapter including an inlet with an area greater than an outlet.

4. The furnace of claim 1 being capable of reversible operation with fluid flowing selectively from either the inlet to the cutlet within said charge well or from the cutlet to the inlet within said charge well.

5. A charge well comprising an open top chamber including side and base walls of a heat resistant material, an inlet in a side wall of the chamber for receiving molten metal, a ramp adjacent said side wall of the chamber, an inner wall forming a central cavity, said ramp disposed between said inner wall and said side wall, said ramp inclined from an intersection with the base wall to adjacent a top surface of said inner wall, said cavity in fluid communication with an outlet, a passage in said inner wall providing fluid communication between said inlet and said cavity, and a removable insert comprised of a heat resistant material shaped for removable securement within said passage, said removable insert blocking at least a portion of said passage.

6. The charge well of claim 5 wherein said insert includes a top surface forming an at least substantially contiguous rim with a top surface of said inner wall.

7. The charge well of claim 5 wherein said insert is disposed above said base wall.

8. The charge well of claim 5 wherein said inner wall includes one of a key and a keyway and said insert includes the other of the key and the keyway.

9. The charge well of claim 5 wherein said removable insert at least substantially fully blocking said passage.

* * * * *